(12) United States Patent
Tachibana (10) Patent No.: US 9,602,579 B2
(45) Date of Patent: Mar. 21, 2017

(54) COMMUNICATION APPARATUS, METHOD FOR CONTROLLING THE SAME, AND PROGRAM

(71) Applicant: CANON KABUSHIKI KAISHA, Tokyo (JP)

(72) Inventor: Hideaki Tachibana, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 242 days.

(21) Appl. No.: 14/338,230

(22) Filed: Jul. 22, 2014

(65) Prior Publication Data

US 2014/0337415 A1 Nov. 13, 2014

Related U.S. Application Data

(63) Continuation of application No. PCT/JP2014/050504, filed on Jan. 15, 2014.

(30) Foreign Application Priority Data

Jan. 25, 2013 (JP) ................................. 2013-012135

(51) Int. Cl.
*G06F 15/16* (2006.01)
*H04L 29/08* (2006.01)
*H04L 29/06* (2006.01)
*H04W 8/00* (2009.01)
*H04W 84/12* (2009.01)
*H04W 84/20* (2009.01)

(52) U.S. Cl.
CPC .............. *H04L 67/06* (2013.01); *H04L 67/42* (2013.01); *H04W 8/005* (2013.01); *H04L 67/02* (2013.01); *H04L 67/16* (2013.01); *H04W 84/12* (2013.01); *H04W 84/20* (2013.01)

(58) Field of Classification Search
USPC ............... 709/202, 203, 218, 219, 224, 225; 705/26.8, 51; 715/227; 358/1.15; 455/436; 370/252, 328
See application file for complete search history.

(56) References Cited

U.S. PATENT DOCUMENTS 6,397,246 B1 * 5/2002 Wolfe ............... G06F 17/30902
709/225
6,442,601 B1 * 8/2002 Gampper ................ H04L 29/06
709/218

(Continued)

FOREIGN PATENT DOCUMENTS

JP 2005-277937 A 10/2005
JP 2008-035374 A 2/2008

(Continued)

*Primary Examiner* — Quang N Nguyen
(74) *Attorney, Agent, or Firm* — Canon USA, Inc. IP Division (57) ABSTRACT

Roles of communication apparatuses in a service executed by the communication apparatuses and roles of the communication apparatuses in a layer different from a layer corresponding to the service are efficiently controlled.

A communication apparatus determines whether to function as a base station or a terminal. The communication apparatus determines to function as the base station when functioning as a server of a service executed with another communication apparatus.

13 Claims, 5 Drawing Sheets

(56) References Cited

U.S. PATENT DOCUMENTS

| | | | | |
|---|---|---|---|---|
| 6,463,418 B1* | 10/2002 | Todd | ................... | G06Q 30/06 |
| | | | | 705/26.8 |
| 6,502,106 B1* | 12/2002 | Gampper | .......... | G06F 17/30902 |
| | | | | 709/202 |
| 7,003,799 B2* | 2/2006 | Jorgenson | ............... | H04L 29/06 |
| | | | | 705/51 |
| 7,734,292 B2* | 6/2010 | Cho | .................... | H04W 76/023 |
| | | | | 455/436 |
| 8,665,787 B2* | 3/2014 | Nagai | ................... | H04W 88/02 |
| | | | | 370/328 |
| 2005/0038874 A1* | 2/2005 | Ramaswamy | .......... | H04L 29/06 |
| | | | | 709/219 |
| 2005/0138426 A1* | 6/2005 | Styslinger | ............ | H04L 63/0281 |
| | | | | 709/224 |
| 2005/0198568 A1* | 9/2005 | Matsuzaki | .......... | G06F 17/2247 |
| | | | | 715/227 |
| 2006/0082807 A1* | 4/2006 | Tanaka | .................. | G06F 3/1204 |
| | | | | 358/1.15 |
| 2011/0110247 A1* | 5/2011 | Halfmann | .......... | H04B 7/15557 |
| | | | | 370/252 |
| 2013/0013673 A1* | 1/2013 | Ahmed | ............. | G06F 17/30902 |
| | | | | 709/203 |
| 2013/0094441 A1* | 4/2013 | Milner | .................. | H04W 4/001 |
| | | | | 370/328 |

FOREIGN PATENT DOCUMENTS

| | | |
|---|---|---|
| JP | 2008-172407 A | 7/2008 |
| JP | 2011-35768 A | 2/2011 |

* cited by examiner

COMMUNICATION APPARATUS, METHOD FOR CONTROLLING THE SAME, AND PROGRAM

CROSS-REFERENCE TO RELATED APPLICATIONS

This application is a Continuation of International Patent Application No. PCT/JP2014/050504, filed Jan. 15, 2014, which claims the benefit of Japanese Patent Application No. 2013-012135, filed Jan. 25, 2013, both of which are hereby incorporated by reference herein in their entirety.

TECHNICAL FIELD

The present invention relates to a communication apparatus, a method for controlling the communication apparatus, and a program.

BACKGROUND ART

In recent years, electronic devices, such as digital still cameras and printers, having a function of a wireless LAN station for connecting the electric devices to a wireless LAN as communication apparatuses have been widely used. For example, PTL1 discloses a method for facilitating image sharing performed by digital still cameras having a wireless LAN function.

Here, a standard of Wi-Fi Direct (registered trademark) is established by Wi-Fi Alliance. In Wi-Fi Direct (hereinafter referred to as "WFD"), a protocol for determining whether each of electronic devices operates as a wireless LAN access point or a wireless LAN station is specified. When the protocol is executed, an electronic device functioning as a wireless LAN access point and an electronic device functioning as a wireless LAN station may be automatically determined. When WED is used, an access point is not required to be additionally provided and various services (image sharing, printing, and the like) may be performed between electronic devices through direct communication, and therefore, usability is improved.

Furthermore, a function of searching for content of services provided by other devices in an application layer (service discovery function) is prescribed as an optional function of Wi-Fi Direct. According to the service discovery function, information on services provided by an electronic device which is a counterpart of connection may be obtained before a connection process is performed, and therefore, usability is improved.

CITATION LIST

Patent Literature

PTL 1 Japanese Patent Laid-Open No. 2011-35768

In the related art, connection control in a wireless layer using WFD and control of a service in an application layer which is a higher layer relative to the wireless layer are independent from each other. Therefore, a role in the wireless layer which is not suitable for executing the service in the application layer may be set.

In addition, re-connection in the wireless layer performed every time the role in the service is changed in the application layer is not efficient since a processing load is increased.

Accordingly, an object of the present invention is to provide a communication apparatus which efficiently controls roles of communication apparatuses in a service executed by the communication apparatuses and roles of the communication apparatuses in a layer different from a layer corresponding to the service.

SUMMARY OF INVENTION

To attain the object described above, the communication apparatus according to the present invention includes constructing means for causing the communication apparatus to function as a base station to construct a network, connecting means for causing the communication apparatus to function as a terminal to be connected to the network, determining means for determining whether the communication apparatus functions as the base station or the terminal, transmitting means for causing the communication apparatus to function as a client of a service executed with another communication apparatus and transmitting a file to the other communication apparatus, and receiving means for causing the communication apparatus to function as a server of the service executed with the other communication apparatus and receiving a file transmitted from the other communication apparatus. The determining means determines that the communication apparatus functions as the base station when functioning as the server of the service executed with the other communication apparatus.

Furthermore, to attain the object described above, the communication apparatus according to the present invention includes constructing means for causing the communication apparatus to function as a base station to construct a network, connecting means for causing the communication apparatus to function as a terminal to be connected to the network, communicating means for causing the communication apparatus to communicate with another communication apparatus while the communication apparatus serves as the base station or the terminal, determining means for determining a role of the communication apparatus to execute a service in an application layer, and changing means for changing the role determined by the determining means, while the role for the communication by the communicating means is maintained, after the service in the application layer is executed in accordance with the role determined by the determination means.

Further features of the present invention will become apparent from the following description of exemplary embodiments with reference to the attached drawings.

DESCRIPTION OF EMBODIMENTS

First Embodiment

A communication apparatus according to a first embodiment will be described in detail hereinafter with reference to the accompanying drawings. In a description below, a case where a wireless LAN system based on the IEEE 802.11 series is described as an example. However, a communication form is not limited to the wireless LAN based on the IEEE 802.11.

A hardware configuration of a preferred example of this embodiment will be described.

Figure 1:
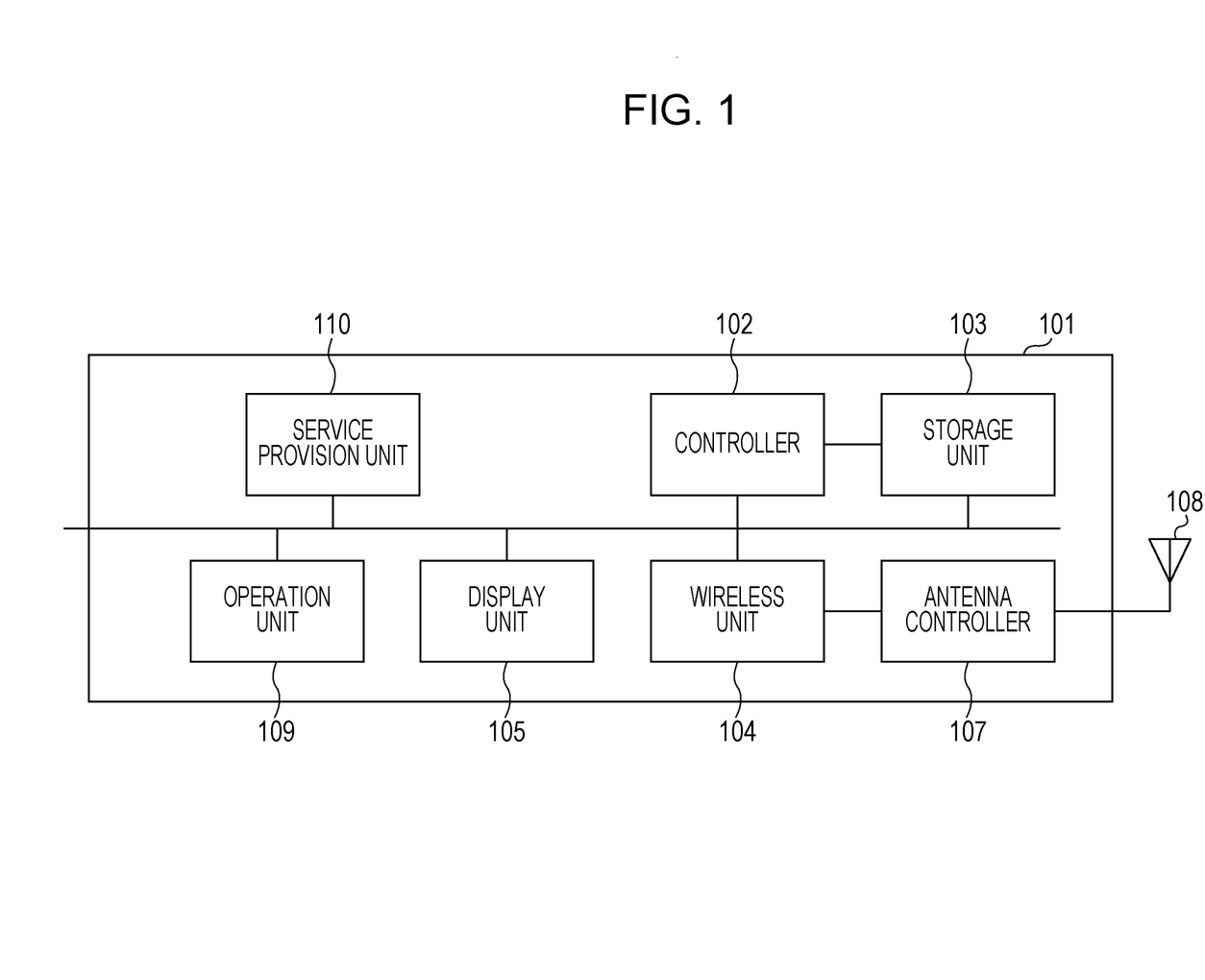
FIG. 1 is a block diagram illustrating a configuration of an apparatus.

FIG. 1 is a block diagram illustrating an example of a configuration of apparatuses described below according to the embodiment of the present invention. A reference numeral 101 represents the entire apparatus. A reference numeral 102 represents a controller which controls the entire apparatus by executing a control program stored in a storage unit 103. The controller 102 includes a single processor or a plurality of processors such as CPUs and MPUs. The controller 102 also performs control of a setting of communication parameters for communication with other apparatuses. The storage unit 103 stores the control program to be executed by the controller 102 and various types of information including the communication parameters. Furthermore, the storage unit 103 may store image data, files, and the like which are generated by the communication apparatus or which are received from external apparatuses. The storage unit 103 includes various memories including a ROM, a RAM, an HDD, and a flash memory. Here, various operations described below are performed when the controller 102 executes the control program stored in the storage unit 103.

A reference numeral 104 represents a wireless unit which performs wireless LAN communication based on the IEEE 802.11 series. A reference numeral 105 represents a display unit having a function enabling output of information visually recognizable performed by an LCD or an LED or output of sound performed by a speaker or the like. The display unit 105 has a function of outputting at least one of visual information and sound information.

A reference numeral 107 represents an antenna controller, and a reference numeral 108 represents an antenna. The antenna controller 107 controls the antenna 108 so as to transmit and receive signals by wireless communication. A reference numeral 109 represents an operation unit used by a user to perform various inputs to operate the communication apparatus. The operation unit 109 includes various buttons and a touch panel.

A service provision unit 110 has a function of providing services in an application layer of the communication apparatus. When the communication apparatus is a printer, for example, the communication apparatus is provided with a printing function. When the communication apparatus is a digital still camera, for example, the communication apparatus is provided with an imaging function.

Note that FIG. 1 is merely an example, and the communication apparatus 101 may have a hardware configuration other than the hardware configuration illustrated in FIG. 1.

Figure 2:
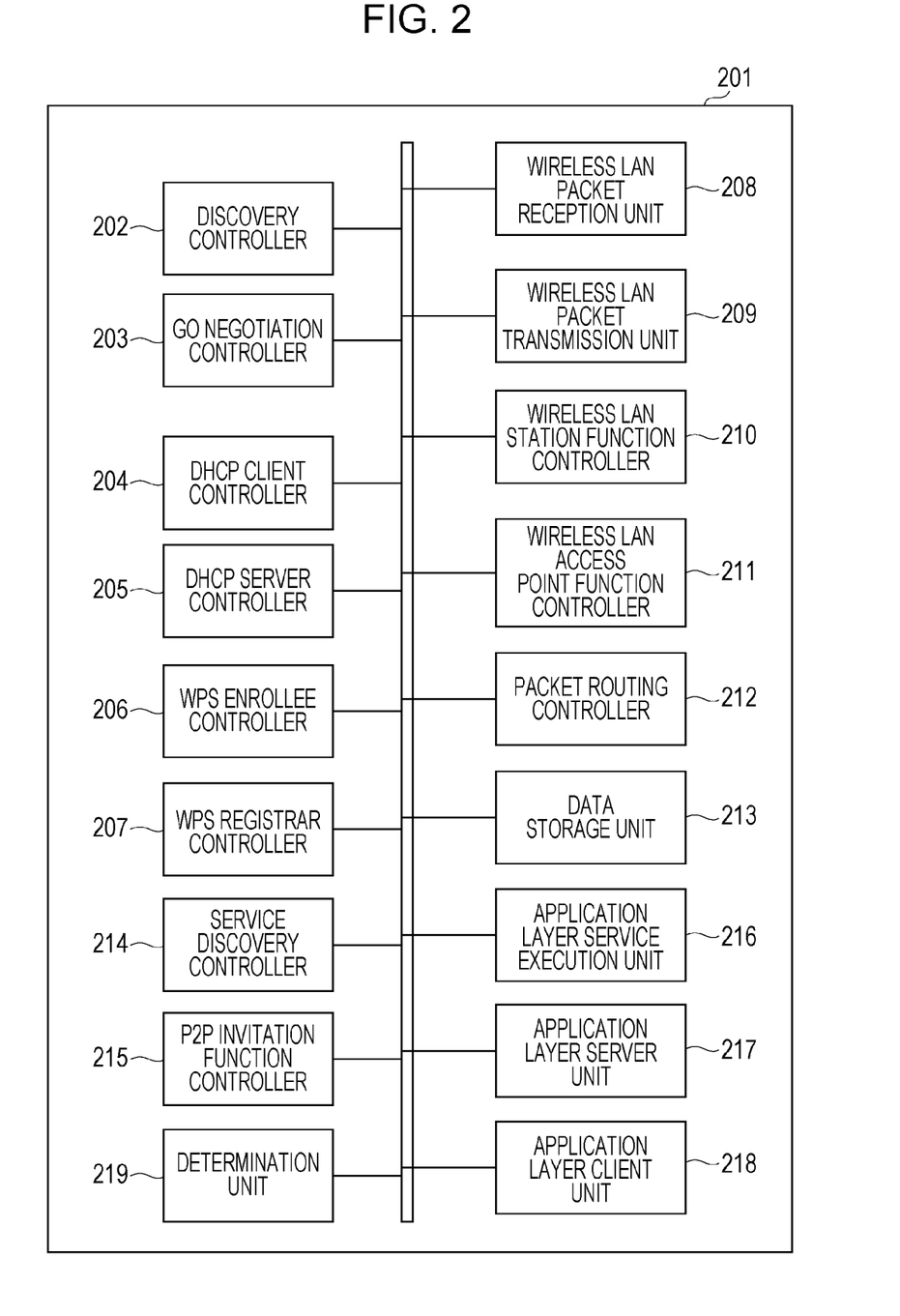
FIG. 2 is a block diagram illustrating software functions of the apparatus.

FIG. 2 is a block diagram illustrating a configuration of a software functional blocks which execute a communication control function described below. A reference numeral 201 represents an entire software functional block. A reference numeral 202 represents a discovery controller which performs a search operation of searching for a communication apparatus serving as a communication counterpart.

A reference numeral 203 represents a GO negotiation controller. The GO negotiation controller 203 performs control based on a specification of a Wi-Fi Direct protocol and determines roles of communication apparatuses, that is, determines a communication apparatus serving as a wireless LAN access point and a communication apparatus serving as a wireless LAN station, in a wireless layer. In Wi-Fi Direct, a communication apparatus which executes a wireless LAN access point function is referred to as a P2P group owner (hereinafter referred to as a "GO") and a communication apparatus which executes a wireless LAN station function is referred to as a P2P client (hereinafter referred to as a "CL"). When the communication apparatus serves as the GO or the wireless LAN access point, a wireless LAN access point function controller 211, which will be described hereinafter, is activated, whereas when the communication apparatus serves as the CL or the wireless LAN station, a wireless LAN station function controller 210, which will be described hereinafter, is activated. A protocol of GO negotiation is prescribed by the specification of Wi-Fi Direct. However, this is not important in the present invention, and therefore, a description thereof is omitted. In Wi-Fi Direct, a network constructed by the GO is referred to as a "P2P group". In this embodiment, the network may be referred to as the "P2P group" where appropriate. These terms have the same meaning in this embodiment.

Note that, in this specification, the P2P group owner (GO), the P2P client (CL), and a group of communication apparatuses in which roles have not been determined are collectively referred to as "P2P devices".

A reference numeral 204 represents a DHCP client controller and is activated when the GO negotiation controller 203 determines that the communication apparatus including the DHCP client controller 204 serves as a wireless LAN station. A reference numeral 205 represents a DHCP server controller and is activated when the GO negotiation controller 203 determines that the communication apparatus including the DHCP server controller 205 serves as a wireless LAN access point.

A reference numeral 206 represents a WPS enrollee controller which receives communication parameters required for wireless LAN communication from a WPS registrar apparatus separately provided. As with the DHCP client controller 204, the WPS enrollee controller 206 operates when the communication apparatus including the WPS enrollee controller 206 serves as the wireless LAN station. A reference numeral 207 represents a WPS registrar controller which supplies communication parameters required for wireless LAN communication to a WPS enrollee apparatus separately provided. As with the DHCP server controller 205, the WPS registrar controller 207 operates when a communication apparatus including the WPS registrar controller 207 serves as the wireless LAN access point. Note that the communication parameters supplied from the WPS registrar include parameters of an SSID serving as a network identifier, an encryption key, an encryption method, an authentication key, an authentication method, and the like.

A reference numeral 208 represents a wireless LAN packet reception unit and a reference numeral 209 represents a wireless LAN packet transmission unit. The wireless LAN packet reception unit 208 and the wireless LAN packet transmission unit 209 receive and transmit, respectively, various packets including communication protocols of higher layers. A reference numeral 210 represents the wireless LAN station function controller. The wireless LAN station function controller 210 performs an authentication and encryption process and the like when the communication apparatus including the wireless LAN station function controller 210 functions as the wireless LAN station and is connected to a wireless network which is constructed by an apparatus functioning as the wireless LAN access point. A reference numeral 211 represents the wireless LAN access point function controller which constructs a wireless network when the communication apparatus including the wireless LAN access point function controller 211 functions as the wireless LAN access point, and performs an authentication and encryption process, management of a communication partner apparatus, and the like. One of the function of the wireless LAN station function controller 210 and the function of the wireless LAN access point function controller 211 may be solely operated or both of the functions may be simultaneously operated.

A reference numeral 212 represents a packet routing controller which performs bridge and routing of communication packets while the wireless LAN access point function controller 211 is in operation. A reference numeral 213 represents a data storage unit which stores software itself, wireless LAN parameters, and various tables including the DHCP address table described above and an ARP table.

A reference numeral 214 represents a service discovery controller which controls a service discovery function unique to Wi-Fi Direct. Use of the service discovery function enables transmission and reception of service information of a counterpart communication apparatus by transmitting and receiving an action frame specified by the IEEE 802.11u. Specifically, SD Query is transmitted and SD Response is received as a response. Alternatively, SD Query supplied from the partner apparatus is received and SD Response is transmitted as a response.

A reference numeral 215 represents a P2P invitation function controller which controls an invitation function specified by the standard of Wi-Fi Direct. Although a description of the invitation function is omitted since the invitation function is prescribed in the specification of Wi-Fi Direct, the invitation function prompts a P2P device which is not determined to function as the GO device or the CL device to be connected as a P2P client.

A reference numeral 216 represents a service execution unit which executes a service in the application layer. Here, the term "application layer" corresponds to a service provision layer which is equal to or higher than the fifth layer of the OSI reference model. Specifically, the service execution unit 216 executes a printing function (a printing service), an image streaming function (a moving image streaming service), a file transfer function (a file transfer service), and the like. Note that files transferred (transmitted and received) by the file transfer service may include data of various formats.

A reference numeral 217 represents a server unit which provides services in the application layer. The server unit 217 causes the communication apparatus to function as a provision apparatus (a server) which provides services in the application layer. The server unit 217 performs reception of image streaming and reception and storage of file data and functions as a responder. Specifically, the server unit functions as an HTTP (Hypertext Transfer Protocol) server or an FTP (File Transfer Protocol) server.

A reference numeral 218 represents a client unit which uses the services in the application layer. The client unit 218 causes the communication apparatus to function as a user apparatus (a client) which uses the services in the application layer. The client unit 218 performs transmission of image streaming, transmission of file data, and the like and functions as a transmitter. Specifically, the client unit 218 functions as an HTTP client or an FTP client, for example.

A reference numeral 219 represents a determination unit. The determination unit 219 performs various determination processes including a determination as to whether consistency is maintained between the application layer and the wireless LAN layer and a determination as to whether a service is to be continuously executed while the wireless layer is maintained.

Note that it is not necessarily the case that all the functional blocks illustrated in FIG. 2 are provided by software, and the functional blocks may be provided by hardware. The functional blocks illustrated in FIG. 2 are associated with one another. Furthermore, the functional blocks illustrated in FIG. 2 are merely examples, and a plurality of functional blocks may constitute a single functional block or one of the functional blocks may be divided into blocks which have respective functions.

Figure 3:
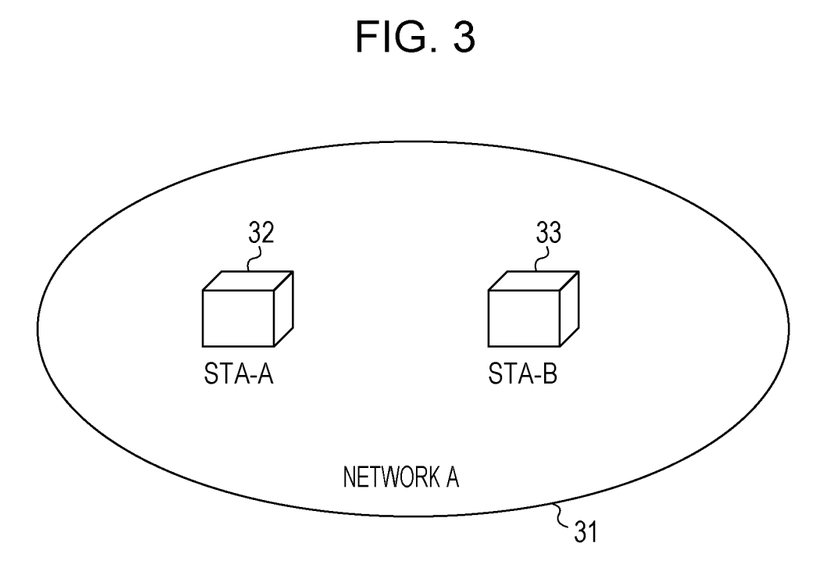
FIG. 3 is a diagram illustrating an example of a network configuration to which the present invention is applied.

FIG. 3 is a configuration diagram according to this embodiment.

A network A 31 (hereinafter referred to as a "network A") including communication apparatus A 32 (hereinafter referred to as an "STA-A") and a communication apparatus B 33 (hereinafter referred to as an "STA-B") is illustrated. The network A is a wireless network formed in accordance with Wi-Fi Direct and constructed by one of the STA-A and the STA-B which functions as the GO. All the apparatuses illustrated in FIG. 3 have the configurations illustrated in FIGS. 1 and 2.

In this embodiment, a use case where the STA-A and the STA-B communicate with each other by HTTP communication such that a process of transmitting a moving image file from the STA-B to the STA-A is performed, and thereafter, a process of transmitting a moving image file from the STA-A to the STA-B is performed by switching a direction of transfer of the file is performed is assumed. Note that a protocol used in the file transfer service is not limited to HTTP but other file transfer protocols including FTP may be used, that is, this embodiment does not limit the protocol.

Figure 4:
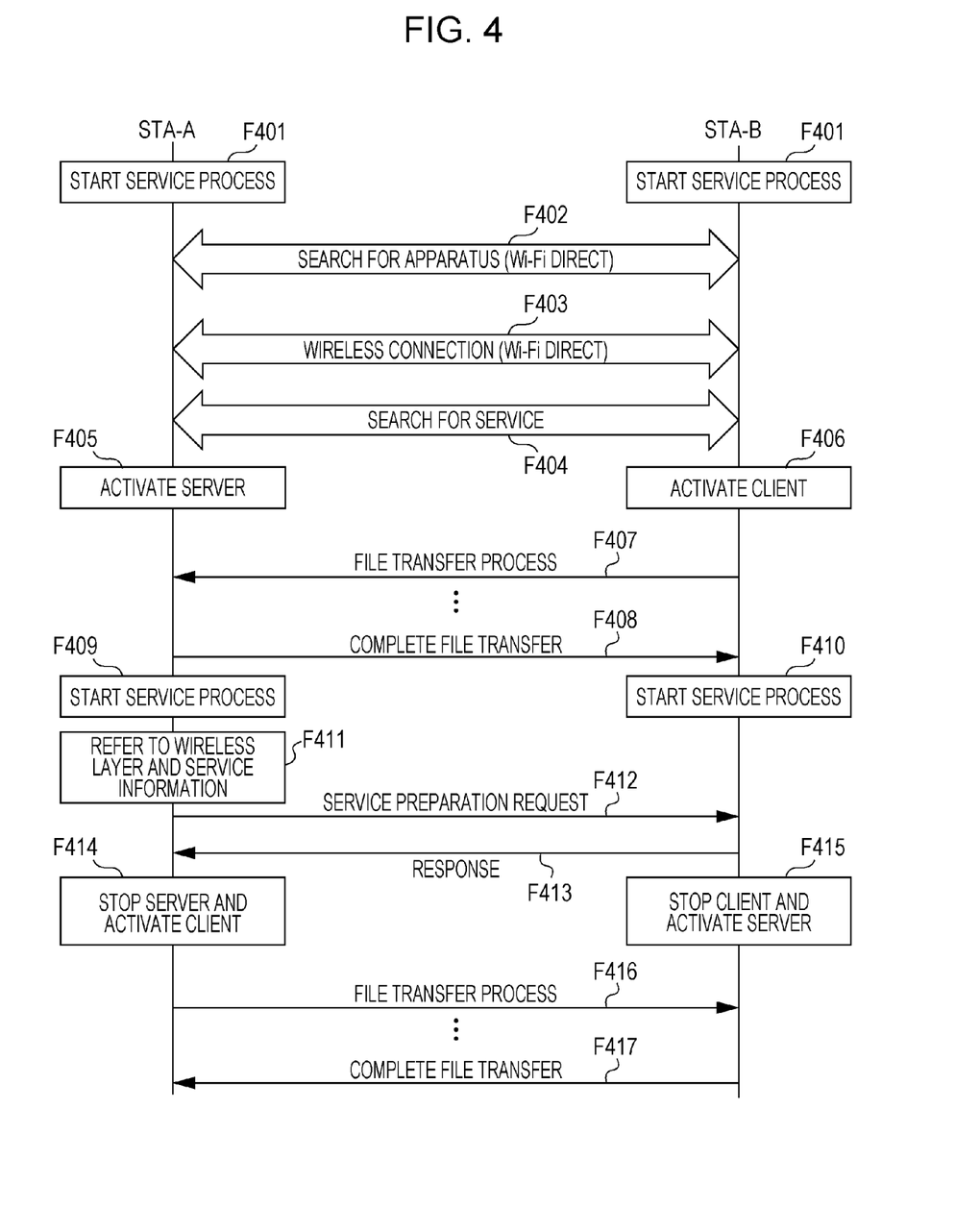
FIG. 4 is a diagram illustrating an operation sequence according to a first embodiment.

FIG. 4 is a diagram schematically illustrating an operation sequence performed between the apparatuses. The STA-A and the STA-B start a service process when a user performs an input process (F401). In the example of FIG. 4, a file transfer service in which a moving image file is transmitted from the STA-B to the STA-A is started. Here, the STA-A is instructed to start a file reception service by a user's operation. On the other hand, the STA-B is instructed to start a file transmission service by a user's operation. In response to the user's instruction, the STA-A searches for a partner apparatus to communicate in a wireless manner (F402). When the STA-B is detected by the searching, the STA-A performs a wireless connection to the STA-B in accordance with a user's instruction (F403). In the searching process in F402 and the connection process in F403, a method prescribed by the specification of Wi-Fi Direct described above is used. Accordingly, by performing these processes, roles of the STA-A and the STA-B in the relationship between the STA-A and the STA-B in the wireless layer are determined. Specifically, the GO and the CL of Wi-Fi Direct are determined in the relationship between the STA-A and the STA-B.

Here, the roles of the apparatuses in the wireless layer are automatically determined in accordance with roles in a service to be executed. Specifically, the application layer server unit 217 determines an apparatus functioning as a server of the service as the GO in the wireless layer. This is because, when an apparatus having a server function of the service functions as the GO and serves as a wireless base station, processes required to perform the service including a process of assigning an address in TCP/IP, a process of setting a communication port, and the like may be reliably performed. In the example of FIG. 4, the STA-A which performs file reception in the file transfer service functions as a server. On the other hand, the STA-B which performs file transmission in the file transfer service functions as a client. Accordingly, in the example of FIG. 4, the STA-A serves as the GO.

Next, a service is searched for between the STA-A and the STA-B. As a search method, an SSDP prescribed by UPnP (Universal Plug and Play) is used (F404).

When the searching for a service is completed, the STA-A activates a server (an HTTP server in the example of FIG. 4) which is used to execute the service (F405). Thereafter, the STA-A opens a port corresponding to the service to be provided and performs a standby process for connection to the port. When the searching for a service is completed, the STA-B activates a client (an HTTP client in the example of FIG. 4) which is used to execute the service (F406).

Note that the order of the process of activating the server and the client and the process of searching for a service performed by the apparatuses may be reversed.

The STA-B is connected to the port which is opened by the STA-A and functions as a transmitter which transmits a moving image file to the STA-A. Specifically, in this embodiment, the moving image file is transmitted using HTTP PUT or HTTP POST (F407).

When the transmission process is completed, the STA-A notifies the STA-B of the completion of the file transfer (F408).

After the file transfer from the STA-B to the STA-A is completed, a case where the STA-A transmits a moving image file to the STA-B in accordance with a user's operation will be in turn considered. Specifically, the roles (the server and the client) of the apparatuses in the executed service are switched from one to another. Here, a file transfer service in which a moving image file is transmitted from the STA-A to the STA-B is started. Therefore, unlike F401, the STA-B is instructed to start a file reception service by a user's operation. On the other hand, the STA-A is instructed to start a file transmission service by a user's operation. A service process is started in the apparatuses in accordance with the instructions (F409 and F410).

Thereafter, the STA-A checks a connection state in the wireless layer and content of the service to be executed (F411). This is because it is determined whether the wireless layer is to be reconstructed for executing the service. An algorithm of the determination will be described hereinafter with reference to a flowchart described below. When the service is executable in a state in which the connection in the wireless layer is maintained, the STA-A does not change the wireless layer and the communication port but changes only the role of the server to the role of the client in the service in the application layer. Here, the role of the server is switched to the role of the client since a direction of transfer of a moving image file is different from that of F407, and therefore, the STA-A is not capable of performing active transfer of a moving image file to the STA-B if the state in which the STA-A serves as the server is maintained.

Accordingly, the STA-A transmits a service preparation request to the STA-B (F412). This request, specifically, instructs the STA-B to activate a server which provides a service.

The STA-B transmits a response representing whether the server may be activated (F413).

Note that, instead of transmission of the service preparation request, the STA-A may spontaneously activate a client. The STA-B may also spontaneously activate a server when the server is lost.

When the STA-B is capable of activating the HTTP server, the STA-A stops the HTTP server function of itself and activates an HTTP client function (F414). On the other hand, when the STA-B is capable of activating the HTTP server, the STA-B stops the HTTP client function and activates an HTTP server function (F415). Note that, when the HTTP server function and the HTTP client function are allowed to be simultaneously activated, the HTTP client function is not required to be stopped. After the connection to the service is completed, the STA-A performs transmission of a moving image file. In this embodiment, the moving image file is transmitted using HTTP PUT or HTTP POST (F416). When the transmission process is completed, the STA-B notifies the STA-A of the completion of the file transfer (F417).

As described above, in this embodiment, in a case where connection in the wireless layer has not been established such as a case where the service is executed for the first time, control is performed such that an HTTP server serves as the GO. On the other hand, in a case where the connection in the wireless layer has been established such as a case where the service is executed for the second time, even when switching between roles is performed in the application layer, switching between roles are not performed in the wireless layer. That is, only switching between the roles in the application layer is performed.

Figure 5:
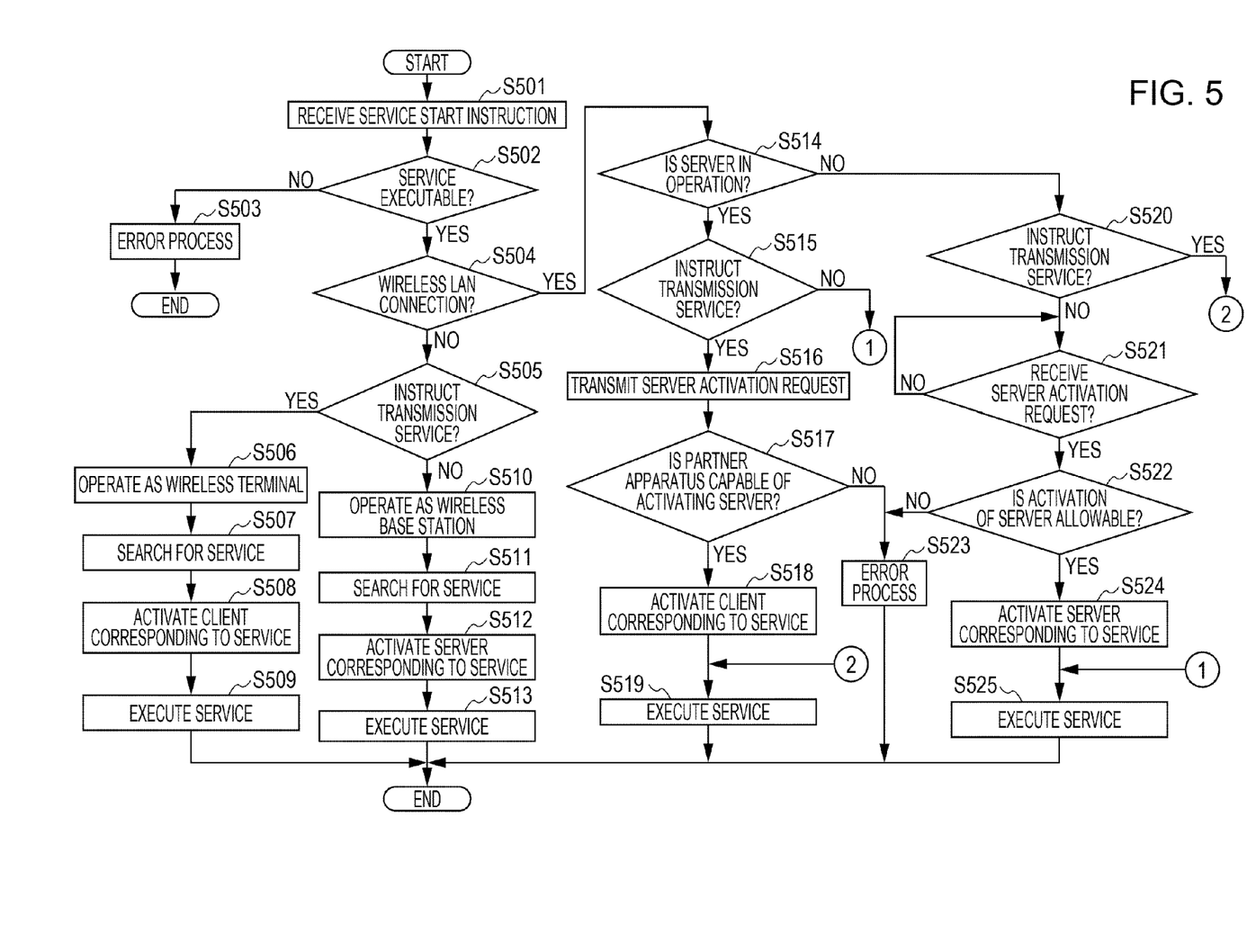
FIG. 5 is a flowchart illustrating an operation of the apparatus according to the first embodiment.

FIG. 5 is a flowchart illustrating operation of the communication apparatus according to this embodiment. Steps in this flowchart are processed when the controller 102 executes programs stored in the storage unit 103. Note that, in a description below, a case where a file transfer service is executed as a service in the application layer performed between the communication apparatuses is described as an example. Specifically, a case where one of the communication apparatuses performs a file transmission service and the other of the communication apparatuses performs a file reception service so that a file transfer service is performed between the communication apparatuses will be described as an example. However, types of service to which this embodiment is applicable are not limited to the file transfer service.

In step S501, the communication apparatus accepts an instruction for starting the service in accordance with a user's operation. In the example of FIG. 5, it is assumed that start of the file transmission service or the file reception service is instructed by the user.

In step S502, the communication apparatus determines whether the service instructed in step S501 is executable. When the file transmission service has been selected, it is determined whether the communication apparatus has the HTTP client function, whereas when the file reception service has been selected, it is determined whether the communication apparatus has the HTTP server function. As a result of the determination in step S502, when the service is not executable, an error process is performed and the process is terminated (S503). On the other hand, when it is determined that the service is executable in step S502, the process proceeds to step S504.

In step S504, the communication apparatus determines whether wireless LAN connection has been established. When it is determined that the wireless LAN connection has not been established, the communication apparatus determined whether the file transmission service is instructed or the file reception service is instructed in step S501 (S505). When it is determined that the file reception service is instructed in step S505, the communication apparatus determines to become the GO as a role in the wireless layer (S510). This is because, when an apparatus having a server function of a service functions as a wireless base station, processes required for performing the service including a process of assigning an address, a process of setting a communication port, and the like may be reliably performed. In step S511, the communication apparatus searches for a service executable in the communication with another communication apparatus serving as a communication counterpart. In this embodiment, it is determined whether the communication apparatus serving as the communication counterpart is capable of executing the file transmission service. As a search method, the SSDP prescribed by UPnP (Universal Plug and Play) is used. When the desired service is executable between the communication apparatus and the communication apparatus serving as the communication counterpart, the communication apparatus activates a server to execute the service (S512). In this example, an HTTP server is activated. Thereafter, a port of the HTTP server is opened, connection from the HTTP client is waited, and connection to the service is performed between the HTTP server and the HTTP client. Here, the communication apparatus executes the service as a responder (S513). Note that the searching for a service in step S511 may be performed after the server is activated.

When it is determined that the file transmission service is instructed in step S505, the communication apparatus determines to become the CL as a role in the wireless layer. Thereafter, in step S507, the communication apparatus searches for a service executable in the communication with the communication apparatus serving as the communication counterpart. In this embodiment, it is determined whether the communication apparatus serving as the communication counterpart is capable of executing the file reception service. As a search method, the SSDP prescribed by UPnP (Universal Plug and Play) is used (S507). When the desired service is executable between the communication apparatus and the communication apparatus serving as the communication counterpart, the communication apparatus activates a client to execute the service (S508). In this example, an HTTP client is activated. Thereafter, the communication apparatus is connected to the port opened by the HTTP server and performs connection to the service between the HTTP client and the HTTP server. Here, the communication apparatus executes the service as a transmitter (S509). Note that the searching for a service in step S507 may be performed after the client is activated.

When it is determined that the wireless LAN connection has been established in step S504, the process proceeds to step S514. This case may correspond to, as described in F411 of FIG. 4, the case where execution of the service process is instructed for the second time after wireless connection is completed once and the service process is terminated. Specifically, the server or the client in the service in the application layer may be in operation.

In step S514, the communication apparatus determines whether the server is in operation in the service in the application layer (S514).

When it is determined that the server is in operation, the process proceeds to step S515 where the communication apparatus determines whether the file transmission service has been instructed or the file reception service has been instructed in step S501. Only when it is determined that the file transmission service has been instructed, the process proceeds to step S516. To execute the file transmission service, the communication apparatus should perform switching from a role of the HTTP server which is currently in operation to a role of the HTTP client. In this embodiment, in a case where the connection in the wireless layer has been established before the switching between the roles in the application layers is performed, only switching between the roles in the application layer is performed without performing re-connection in the wireless layer. Specifically, the roles of the server and the client are swapped without changing settings of the wireless network and IP addresses. Accordingly, in step S516, the communication apparatus transmits a service preparation request to the communication apparatus serving as the communication counterpart. The service preparation request is transmitted to activate the HTTP server. Note that the server device may spontaneously activate the client instead of the transmission of the service preparation request.

It is determined whether the communication apparatus serving as the communication counterpart is capable of activating the server function in step S517, and when the determination is affirmative, the HTTP client is activated (S518). Here, the communication apparatus executes the service as a transmitter (S519). When it is determined that the communication apparatus serving as the communication counterpart is not capable of activating the server function in step S517, an error process is performed and the process is terminated (S523).

When it is determined that the file reception service is instructed in step S515, the communication apparatus should activate the HTTP server. However, the server has already been in operation. Accordingly, a process of switching the roles is not particularly performed, and the process proceeds to step S525 where the service is executed.

When it is determined that the server is not in operation in step S514, that is, when it is determined that the client has been in operation, the process proceeds to step S520. In step S520, the communication apparatus determines whether the file transmission service has been instructed or the file reception service has been instructed in step S501. When it is determined that the file reception service has been instructed, the process proceeds to step S521. To execute the file reception service, the communication apparatus should perform switching from the role of the HTTP client which is currently in operation to the role of the HTTP server. As described above, in this embodiment, in a case where the connection in the wireless layer is established before switching between the roles in the application layers is performed, the switching between the roles in the application layer is performed without performing re-connection in the wireless layer. Accordingly, in step S521, the communication apparatus enters a standby state for receiving the service preparation request transmitted from the communication apparatus serving as the communication counterpart. The service preparation request is transmitted to activate the HTTP server.

When receiving the service preparation request, the communication apparatus determines whether the communication apparatus itself is capable of activating the HTTP server (S522). When it is determined that the communication apparatus is not capable of activating the HTTP server, the process proceeds to step S523 where the error process is performed and the process is terminated. When it is determined that the communication apparatus is capable of activating the HTTP server, the process proceeds to step S524. In step S524, the communication apparatus activates the HTTP server. Thereafter, the communication apparatus executes the service as a responder of the service (S525).

When it is determined that the file transmission service has been instructed in step S520, the communication apparatus should activate the HTTP client. However, the client has already been in operation. Accordingly, a process of switching the roles is not particularly performed, and the process proceeds to step S519 where the service is executed.

Note that, although not illustrated in this flowchart, the user may arbitrarily terminate the process in any of the steps.

As described above, in this embodiment, in a case where connection in the wireless layer has not been established such as a case where the service is executed for the first time, control is performed such that the HTTP server serves as the GO. As described above, since the roles in the wireless layer are determined in accordance with the roles in the application layer, the roles in the individual layers may be efficiently controlled. In particular, since the server (the HTTP server, for example) in the application layer functions as the GO in the wireless layer, roles suitable for management of the TCP/IP network may be set.

Furthermore, in a case where the connection of the wireless layer has been established such as a case where the service is executed for the second time, even when switching between the roles is performed in the application layer, switching between the roles is not performed in the wireless layer. That is, only switching between the roles in the application layer is performed. By this, the roles in the individual layers may be efficiently controlled without unnecessarily increasing a processing load.

Note that, although not illustrated in the flowchart of FIG. 5, when a resetting of the wireless layer is required so that the communication apparatus functions as a client, the wireless network may be reconstructed. In particular, when a third communication apparatus is newly connected to the network, for example, reconstruction of the network is required. In this case, after the network is disconnected, the flowchart illustrated in FIG. 5 is newly executed.

Other Embodiments

The foregoing embodiment is an example for embodying the present invention and various modifications may be made without departing from the scope of the present invention.

The communication apparatus of the foregoing embodiment is not limited to a digital still camera, a printer, and the like. The communication apparatus may be a PC, a tablet terminal, or a mobile terminal such as a cellular phone and a smart phone. Furthermore, the communication apparatus may be an image processing apparatus such as a photocopier, a scanner, a FAX, and a multifunction device or a digital home appliance such as a television set and a recorder.

Furthermore, the foregoing embodiment is described taking the wireless LAN based on the IEEE 802.11 as an example. However, the present invention may be embodied in other wireless communications including a wireless USB, MBOA, Bluetooth (registered trademark), UWB, and ZigBee (registered trademark). Furthermore, the present invention may be embodied in wired communication media including a wired LAN. Here, "MBOA" stands for Multi Band OFDM Alliance. Moreover, UWB includes a wireless USB, wireless 1394, and WINET.

Furthermore, the present invention is realized by executing the following processing. Specifically, software (programs) which realizes the functions of the foregoing embodiment is supplied to a system or an apparatus through a network or various storage media, and a computer (or a CPU, an MPU, or the like) of the system or the apparatus reads and executes a program code. In this case, the programs and the storage media which store the programs are included in the present invention.

According to the present invention, roles of communication apparatuses in a service executed by the communication apparatuses and roles of the communication apparatuses in a layer different from a layer corresponding to the service may be efficiently controlled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus operating a communication role in a wireless network, the communication apparatus comprising:
   a wireless interface to interface to the wireless network;
   a processor; and
   a memory containing instructions that, when executed by the processor, cause the processor to perform operations comprising:
   determining the communication role in accordance with a peer-to-peer (P2P) service requested by a user, the communication role being a base station or a terminal; and
   controlling the wireless interface to receive a reception file from a partner apparatus in the wireless network when the communication role is the base station and to transmit a transmission file to the partner apparatus when the communication role is the terminal.

2. The communication apparatus according to claim 1, wherein controlling comprises:
   activating an HTTP server when the communication role is the base station; and
   activating an HTTP client the communication role is the terminal.

3. The communication apparatus according to claim 1, wherein
   the wireless network is a wireless LAN based on IEEE 802.11.

4. The communication apparatus according to claim 1, wherein the operations further comprise:
   accepting an instruction for receiving a file when the communication role is the base station; and
   accepting an instruction for transmitting a file issued by the user when the communication role is the terminal.

5. The communication apparatus according to claim 1, wherein the base station is P2P group owner based on a specification of Wi-Fi Direct and the terminal is P2P client based on the specification of Wi-Fi Direct.

6. The communication apparatus according to claim 1, wherein controlling comprises:
   receiving the reception file transmitted via a wireless connection.

7. The communication apparatus according to claim 1, wherein controlling comprises:
   transmitting the transmission file via a wireless connection when the communication role is the terminal.

8. The communication apparatus according to claim 1, wherein
   the base station and the terminal are used in a wireless LAN based on the IEEE 802. 11.

9. The communication apparatus according to claim 1 wherein the operations further comprise:
   searching for a counterpart P2P service provided by the partner apparatus;
   activating a server or a client according to the requested P2P service; and
   executing the requested P2P service.

10. A method for wireless communication in a communication apparatus operating a communication role, comprising:
    determining the communication role in accordance with a peer-to-peer (P2P) service requested by a user, the communication role being a base station or a terminal; and
    controlling a wireless interface that interfaces to a wireless network to receive a reception file from a partner apparatus when the communication role is the base station and to transmit a transmission file to the partner apparatus when the communication role is the terminal.

11. The method according to claim 10 further comprising:
    searching for a counterpart P2P service provided by the partner apparatus;
    activating a server or a client according to the requested P2P service; and
    executing the requested P2P service.

12. A non-transitory storage medium containing a program which, when executed by a processor, causes the processor to perform operations comprising:
    determining the communication role in accordance with a peer-to-peer (P2P) service requested by a user, the communication role being a base station or a terminal; and
    controlling a wireless interface that interface to a wireless network to receive a reception file from a partner apparatus when the communication role is the base station and to transmit a transmission file to the partner apparatus when the communication role is the terminal.

13. The storage medium according to claim 12 wherein the operations further comprise:
    searching for a counterpart P2P service provided by the partner apparatus;
    activating a server or a client according to the requested P2P service; and
    executing the requested P2P service.

* * * * *